United States Patent
Terashita

(10) Patent No.: US 7,355,754 B2
(45) Date of Patent: Apr. 8, 2008

(54) METHOD, APPARATUS, AND PROGRAM FOR IMAGE PROCESSING

(75) Inventor: Takaaki Terashita, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 908 days.

(21) Appl. No.: 10/446,866

(22) Filed: May 29, 2003

(65) Prior Publication Data

US 2004/0239963 A1    Dec. 2, 2004

(30) Foreign Application Priority Data

May 29, 2002    (JP) .............................. 2002-155747

(51) Int. Cl.
*H04N 1/40* (2006.01)
*H04N 1/56* (2006.01)

(52) U.S. Cl. .................... 358/2.1; 358/3.24; 348/231.6

(58) Field of Classification Search ................. 358/1.9, 358/2.1, 3.24, 518, 527, 530; 382/162, 167, 382/254, 274; 348/221.1, 231.3, 231.6
See application file for complete search history.

(56) References Cited

U.S. PATENT DOCUMENTS

| | | | |
|---|---|---|---|
| 5,016,039 A | 5/1991 | Sosa et al. | |
| 5,596,387 A | 1/1997 | Takagi | |
| 5,710,948 A | 1/1998 | Takagi | |
| 5,739,924 A | 4/1998 | Sano | |
| 6,011,547 A | 1/2000 | Shiota et al. | |
| 6,133,983 A | 10/2000 | Wheeler | |
| 6,301,440 B1 | 10/2001 | Bolle et al. | |
| 6,597,468 B1 * | 7/2003 | Inuiya .................... | 348/231.3 |
| 6,728,428 B1 * | 4/2004 | Kinjo ....................... | 348/231.6 |
| 6,738,510 B2 * | 5/2004 | Tsuruoka et al. ........... | 382/167 |
| 7,145,597 B1 * | 12/2006 | Kinjo ....................... | 348/222.1 |
| 7,170,632 B1 * | 1/2007 | Kinjo ........................ | 358/1.9 |

FOREIGN PATENT DOCUMENTS

| | | |
|---|---|---|
| EP | 0 938 227 A2 | 8/1999 |
| EP | 1 128 660 A2 | 8/2001 |
| EP | 1 152 589 A2 | 11/2001 |
| JP | 03 055536 A | 3/1991 |
| JP | 8-307767 A | 11/1996 |
| JP | 11-88576 A | 3/1999 |
| JP | 2001-177732 A | 6/2001 |
| JP | 2001-186297 | 7/2001 |
| JP | 2001-238129 A | 8/2001 |
| JP | 2001-238177 | 8/2001 |
| JP | 2001-292390 A | 10/2001 |

\* cited by examiner

*Primary Examiner*—Scott A. Rogers
(74) *Attorney, Agent, or Firm*—Birch, Stewart, Kolasch & Birch, LLP

(57) ABSTRACT

Image processing is carried out accurately on image data obtained by a digital camera, and a high-quality reproduced image is obtained. Reading means 21 reads image data S0 and image information obtaining means 22 obtains image information M such as information on presence or absence of a human face and information on frequency regarding an image represented by the image data S0. Scene inference means 23 infers a photography scene based on photography information T attached to the image data S0 and the image information M. Information H on the photography scene is input to image processing means 25 where image processing conditions G in accordance with the scene information H are read from a memory 24. Image processing is carried out on the image data S0 according to the image processing conditions G and processed image data S1 are obtained.

24 Claims, 4 Drawing Sheets

FIG.2

| NO | MAIN PART INFORMATION | SUBJECT DISTANCE | MAGNIFICATION | SUBJECT BRIGHTNESS | FLASH INFORMATION | OTHER INFORMATION | INFERRED SCENE | IMAGE PROCESSING |
|----|----|----|----|----|----|----|----|----|
| 1 | AVAILABLE | | >β1 | >B1 | OFF | BACKGROUND INFORMATION | NORMAL LIGHTING, PORTRAIT | 1 |
| 2 | AVAILABLE | | >β2 | >B2 | OFF | BACKGROUND INFORMATION | BACK LIGHTING, PORTRAIT | 2 |
| 3 | NOT AVAILABLE | ∞ | | >B3 | OFF | FREQUENCY INFORMATION | DISTANT VIEW (SCENERY,BUILDING) | 3 |
| 4 | NOT AVAILABLE | <K4 | >β4 | >B4 | OFF | BRIGHTNESS AT THE POINT OF FORCUS | NORMAL LIGHTING, STILL OBJECT/ANIMAL | 4 |
| 5 | NOT AVAILABLE | <K5 | >β5 | >B5 | OFF | BRIGHTNESS AT THE POINT OF FORCUS | BACKLIGHT, STILL OBJECT/ANIMAL | 5 |
| 6 | NOT AVAILABLE | K61<<K62 | >β6 | >B6 | OFF | HISTOGRAM INFORMATION | MIDDLE-DISTANCE VIEW (LOW-KEY TONES) | 6 |
| 7 | NOT AVAILABLE | K61<<K62 | >β7 | >B7 | OFF | HISTOGRAM INFORMATION | MIDDLE-DISTANCE VIEW (HIGH-KEY TONES) | 7 |
| 8 | AVAILABLE | <K8 | >β8 | >B8 | ON | | DAYTIME SYNCHRONOUS PHOTOGRAPHY,PORTRAIT | 8 |
| 9 | NOT AVAILABLE | <K9 | >β9 | >B9 | ON | | DAYTIME SYNCHRONOUS PHOTOGRAPHY,STILL OBJECT | 9 |
| 10 | AVAILABLE | <K10 | >β10 | <B10 | ON | | NIGHTTIME OUTDOOR, PORTRAIT | 10 |
| 11 | AVAILABLE | <K11 | >β11 | B111<<B112 | ON | | INDOOR, PORTRAIT | 11 |
| 12 | NOT AVAILABLE | ∞ | | <B12 | OFF | SHUTTER SPEED <S11 | NIGHT VIEW | 12 |
| 13 | NOT AVAILABLE | ∞ | | <B13 | OFF | SHUTTER SPEED >S12 | FIREWORKS/NIGHT VIEW | 13 |
| 14 | NOT AVAILABLE | ∞ | | B151<<B152 | OFF | COLOR TEMPERATURE | SUNSET VIEW | 14 |
| 15 | AVAILABLE | K161<<K162 | | | | SHUTTER SPEED <S16 | MOVING OBJECT | 15 |
| 16 | NOT AVAILABLE | | | B171<<B172 | | IMAGE INFORMATION (COLOR) | IN WATER | 16 |

METHOD, APPARATUS, AND PROGRAM FOR IMAGE PROCESSING

This nonprovisional application claims priority under 35 U.S.C. § 119(a) on Patent Application No(s). 2002-155747 filed in JAPAN on May 29, 2002, which is(are) herein incorporated by reference.

BACKGROUND OF THE INVENTION

1. Field of the Invention

The present invention relates to a method and an apparatus for carrying out image processing on image data obtained by a digital camera. The present invention also relates to a program that causes a computer to execute the image processing method.

2. Description of the Related Art

In a digital electronic still camera (hereinafter referred to as a digital camera), an image obtained by photography can be recorded as digital image data in a recording medium such as an internal memory or an IC card, and can be reproduced by a printer or a monitor based on the digital image data. In the case where an image obtained by a digital camera is printed, the image is expected to have as high a quality as a print generated from a negative film.

When a print is generated in the above manner, a quality of the print can be improved by carrying out thereon image processing such as density conversion processing, white balance processing, gradation conversion processing, saturation enhancement processing, and sharpness processing. Therefore, a method for obtaining a high-quality print has been proposed (U.S. Pat. No. 6,011,547). In this method, photography information such as information on an ON or OFF state of flash and the type of lighting is attached as tag information to image data obtained by a digital camera, and more appropriate image processing can be carried out on the image data with reference to the photography information attached to the image data.

The tag information also includes information that is useful for image processing, in addition to the information on the ON or OFF state of flash and the type of lighting. For example, the tag information includes information on a distance to a subject, brightness of the subject, the exposure, a photometric quantity at the time of photography, and presence or absence of backlight. Therefore, various methods have been proposed for carrying out image processing on image data with use of the photography information (U.S. Pat. Nos. 6,133,983, 5,739,924, 5,016,039, 5,596,387 and 5,710,948 and Japanese Unexamined Patent Publication Nos. 8(1996)-307767 and 11(1999)-88576, for example).

In the image processing methods described above, appropriate image processing is carried out on the image data by using the photography information. However, if a subject such as people or scenery included in an image represented by image data varies, an appropriate condition for the image processing cannot be found with accuracy if the photography information is used alone.

Meanwhile, a photography mode (such as portrait mode, scenery/distant view mode, macro/close-up mode, night view/fireworks mode, marine photograph mode, and user exposure correction mode) may be obtained as a portion of the photography information so that the image processing condition can be found based on the photography mode. However, a user may photograph scenery in the portrait mode, for example. If the photography mode is set erroneously in a digital camera, the image processing condition cannot be found appropriately.

SUMMARY OF THE INVENTION

The present invention has been conceived based on consideration of the above circumstances. An object of the present invention is therefore to obtain a high-quality reproduced image by accurately carrying out image processing on image data obtained by a digital camera.

An image processing method of the present invention is a method of obtaining processed image data by carrying out image processing on image data obtained by a digital camera, and the image processing method comprises the steps of:

obtaining photography information attached to the image data;

obtaining image information on an image represented by the image data;

inferring a photography scene of the image data, based on the photography information and the image information;

setting an image processing condition in accordance with the photography scene; and obtaining the processed image data by carrying out the image processing on the image data according to the image processing condition that has been set.

In the image processing method of the present invention, the image processing condition may be set in accordance with the photography scene by selection from predetermined image processing conditions.

The photography scene may be inferred based on any two or more of items of the photography information comprising subject distance, magnification, subject brightness, and a flash state.

The photography information includes the items such as the subject distance, the subject brightness, an exposure quantity, a photometric quantity at the time of photography, camera lens information, and the magnification, in addition to the information on an ON or OFF state of flash and the type of lighting. In the present invention, the photography information does not include information on a photography mode (such as portrait mode, scenery/distant view mode, macro/close-up mode, night view/fireworks mode, marine photograph mode, and user exposure correction mode). The photography information is written in tag information of the image data.

The tag information refers to information attached to the image data obtained by a digital camera, and adopts a standard such as "Baseline TIFF Rev. 6.0.ORGB Full Color Image" which is used as a non-compressed Exif file.

The image information refers to information on various items of the image represented by the image data, such as information on a main part like a human face in the image, information on a size of the background, frequency information on a degree of high-frequency component, information on brightness at the point of focus, histogram information representing a distribution in a histogram, information on color temperature of the image, and information on color distribution.

The information on the main part of the image refers to information on presence or absence of a human face in the image represented by the image data, and information on a size of the human face in the case of presence thereof, for example. Presence or absence of a human face can be known by judging whether or not an area of skin color is equal to or larger than a predetermined area after carrying out skin color extraction processing or the like on the image data.

The image processing condition refers to a parameter for correcting tones, density, or color of the image data, which is not limited to these examples.

The photography scene refers to a target of photography or a combination of a photography target and a photography condition such as lighting. For example, the photography scene refers to portrait, scenery, or close-up flashlight photography, but is not limited to these examples.

An image processing apparatus of the present invention is an image processing apparatus for obtaining processed image data by carrying out image processing on image data obtained by a digital camera, and the image processing apparatus comprises:

photography information obtaining means for obtaining photography information attached to the image data;

image information obtaining means for obtaining image information on an image represented by the image data;

scene inference means for inferring a photography scene of the image data, based on the photography information and the image information; and image processing means for obtaining the processed image data by setting an image processing condition in accordance with the photography scene and then by carrying out the image processing on the image data according to the image processing condition that has been set.

In the image processing apparatus of the present invention, the image processing means may set the image processing condition in accordance with the photography scene by selection from predetermined image processing conditions.

In the image processing apparatus of the present invention, the scene inference means may infer the photography scene based on any two or more of items of the photography information comprising subject distance, magnification, subject brightness and a flash state.

The image processing method of the present invention may be provided as a program that causes a computer to execute the image processing method.

According to the present invention, the photography scene of the image data is inferred based on the photography information attached to the image data and on the image information regarding the image represented by the image data. The image processing is then carried out according to the image processing condition set in accordance with the inferred photography scene. Therefore, the image processing condition can be set with more accuracy than in the case of setting the image processing condition by using the photography information alone. Consequently, the processed image data for reproducing a high quality image can be obtained.

By selecting the image processing condition in accordance with the photography scene from the predetermined image processing conditions, the image processing condition can be set in a short time. Therefore, the image processing can be carried out efficiently.

BRIEF DESCRIPTION OF THE DRAWINGS

FIG. 2 is a table showing a photography scene in accordance with photography information and image information;

DESCRIPTION OF THE PREFERRED EMBODIMENTS

Figure 1:
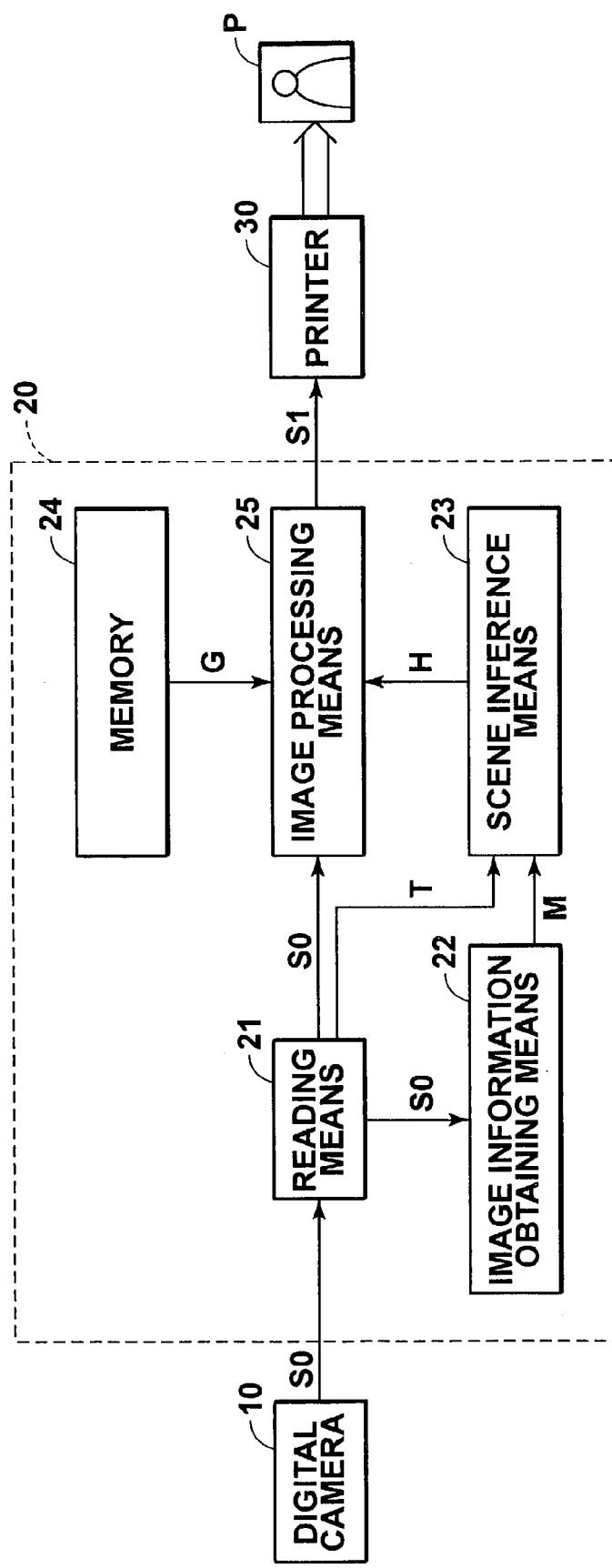
FIG. 1 is a block diagram showing a configuration of an image processing apparatus according to an embodiment of the present invention.

Hereinafter, embodiments of the present invention will be explained with reference to the accompanying drawings. FIG. 1 is a block diagram showing a configuration of an image processing apparatus according to an embodiment of the present invention. As shown in FIG. 1, an image processing apparatus 20 in this embodiment is for outputting a print or prints P (hereinafter referred to as the prints P) from a printer 30 by carrying out various kinds of image processing on image data S0 obtained by photography of a subject with a digital camera 10.

The image processing apparatus 20 comprises reading means 21, image information obtaining means 22, scene inference means 23, a memory 24, and image processing means 25. The reading means 21 reads the image data S0 from a recording medium such as a memory card. The image information obtaining means 22 obtains image information M regarding an image represented by the image data S0, based on the image data S0. The scene inference means 23 obtains scene information H by inferring a photography scene, based on the image information M and photograph information T included in tag information attached to the image data S0. The memory 24 stores various image processing conditions corresponding to the scene information H. The image processing means 25 reads a corresponding set of the image processing conditions in accordance with the scene information H (hereinafter referred to as image processing conditions G) from the memory 24, and obtains processed image data S1 by carrying out image processing on the image data S0 according to the image processing conditions G that have been read. The reading means 21 corresponds to photography information obtaining means.

In this embodiment, the photography information T includes items on subject distance, magnification, subject brightness, flash information representing an ON or OFF state of flash, and shutter speed.

The magnification can be found by dividing a focal distance by the subject distance. The subject brightness can be found in APEX unit by subtracting sensitivity from addition of the aperture and a shutter speed. The focal distance, the aperture, and the sensitivity are included in the photography information.

The image information obtaining means 22 judges presence or absence of a human face in the image represented by the image data S0, and includes a result of the judgment in the image information M. More specifically, a skin-color area is extracted from the image data S0 and the image is judged to include a human face if an area of the skin-color area is not smaller than a predetermined threshold value.

The image information M also includes background information in the case where a background area, which is an area excluding the human face area, is equal to or smaller than a predetermined threshold value.

The image data S0 are subjected to frequency analysis, and high frequency information is included in the image information M in the case where a high frequency component is comparatively dominant.

Brightness information representing brightness at the point of focus is also included in the image information M.

The image information M also includes histogram information representing a distribution in a histogram (such as a maximum and a minimum of the image data), color temperature information representing a color temperature of the image data, and color distribution information representing a main color included in the image represented by the image data S0.

The scene inference means 23 infers the photography scene based on the image information M and the photography information T. FIG. 2 shows a table T representing the photography scene in accordance with the image information M and the photography information T. The table T is stored in the scene inference means 23, and the scene inference means 23 infers the photography scene with reference to the table T. More specifically, the photography scene is inferred based on main part information representing presence or absence of a main part in the image information M, on the subject distance, the magnification, the subject brightness and the flash information included in the photography information T, and on information of other types. The information of other types refers to the background information, the frequency information, the histogram information, the brightness at the point of focus, the color temperature information, and the color information included in the image information M, and refers to the shutter speed included in the photography information T. Coefficients $K_i$, $\beta_i$, and $B_i$ in the table T in FIG. 2 are determined statistically from probabilities, in order to infer the photography scene.

The scene inference means 23 infers the photography scene as portrait in normal lighting in the case of the main part information representing presence of the main part, the magnification being larger than $\beta 1$, the subject brightness being brighter than B1, the flash information representing non-use of flash, and presence of the background information as the information of other types. In this case, the magnification can lead to judgment of whether the image is a portrait of a single person or a class photo.

In the case of the main part information representing presence of the main part, the subject distance being larger than K1, the magnification being larger than $\beta 11$, the subject brightness being brighter than B11 but darker than B112, and the flash information representing use of flash, the scene inference means 23 infers the photography scene as an indoor portrait. In this case, the magnification can also lead to judgment of whether the image is a portrait of a single person or a class photo. The scene inference means 23 outputs the scene information H representing the inferred photography scene to the image processing means 25.

The memory 24 stores the image processing conditions corresponding to the scene information H. For example, in the case where the scene information H represents a portrait in normal lighting, image processing conditions 1 are selected. The image processing conditions 1 are conditions for reproducing a skin of smooth highlight. The image processing conditions 1 cause highlight tones to be soften so that black hair color can be sharpened, and modestly soften contrast of the entire image. In addition, the image processing conditions 1 modestly decrease saturation, and cause only the skin color to have a preferable hue. Furthermore, the image processing conditions 1 modestly increase the density in order not to whiten the highlight tones too much, and modestly decrease sharpness to emphasize image quality of the skin.

In the case where the scene information H represents an indoor portrait, image processing conditions 11 are selected. The image processing conditions 11 are often used in the case of under exposure. Therefore, the density is decreased, and the highlight tones are modestly hardened in order to reproduce a human face in the highlight. In order to reproduce a dark area, tones in a shadow range are softened modestly and saturation is modestly increased by the image processing conditions 11. The image processing conditions 11 are used to carry out standard sharpness processing to harden the entire contrast. The image processing conditions 11 also correct color balance by shifting colors in the entire image toward gray so that an effect of artificial lighting can be weakened.

In the case where a distinction can be made between a portrait of a single person and a class photo based on the magnification, the image processing conditions corresponding to each image are selected.

Figure 3:
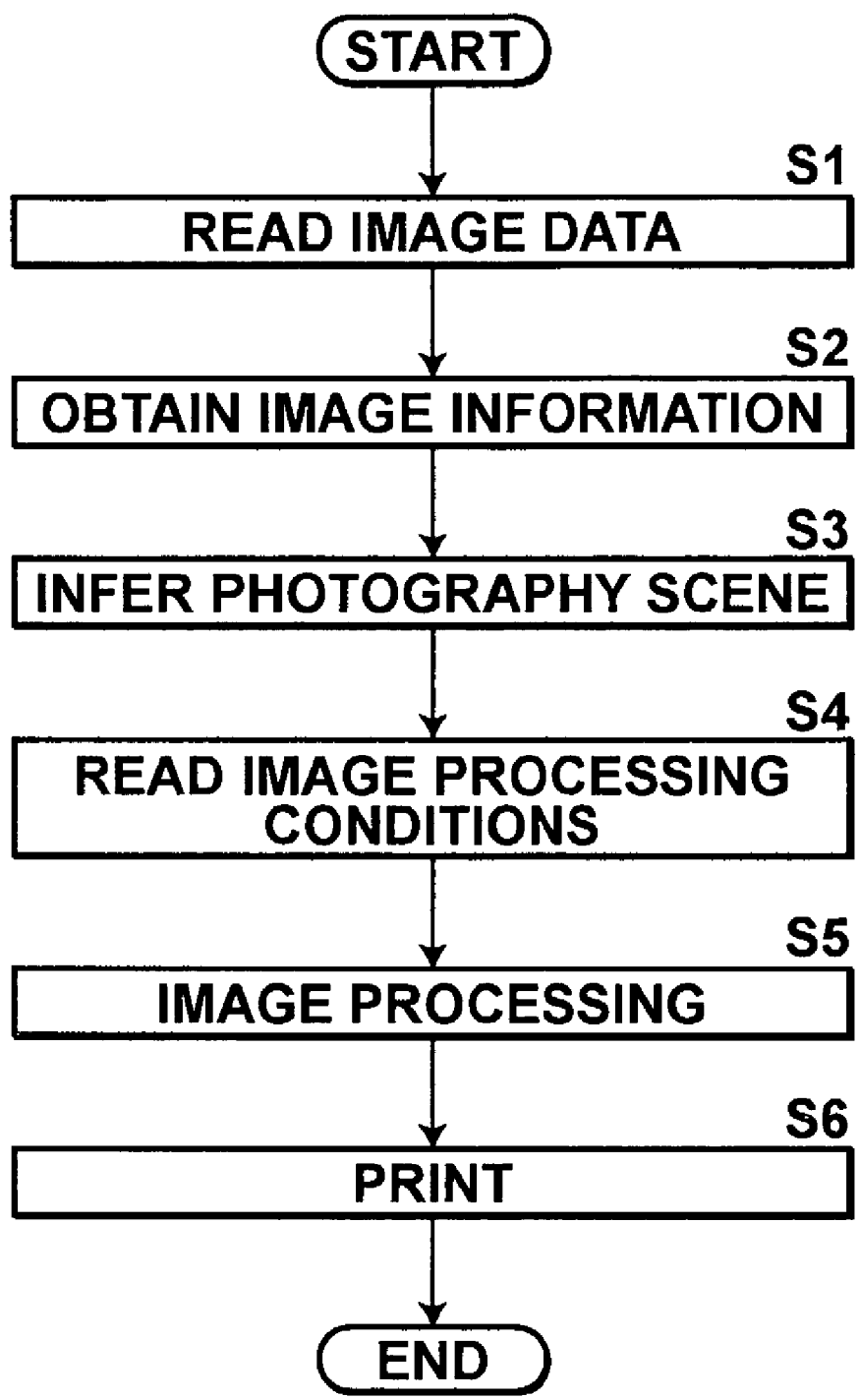
FIG. 3 is a flow chart showing the operation of the embodiment.

The operation of this embodiment will be explained next. FIG. 3 is a flow chart showing the operation of this embodiment. The reading means 21 reads the image data S0 (Step S1). The image data S0 are input to the image information obtaining means 22 where the image information M is obtained (Step S2). The image information M is input to the scene inference means 23 together with the photography information T, and scene information H is obtained by inferring the photography scene (Step S3). The scene information H is input to the image processing means 25 where the image processing conditions G are read from the memory 24 in accordance with the scene information H (Step S4). The image data S0 are subjected to the image processing according to the image processing conditions G, and the processed image data S1 are obtained (Step S5). The printer 30 prints the processed image data S1 (Step S6) to end the operation.

As has been described above, according to this embodiment, the photography scene is inferred based on the photography information T attached to the image data S0 and on the image information M regarding the image represented by the image data S0. The image processing conditions G are set according to the photography scene that has been inferred, and the image processing is carried out according to the image processing conditions G. Therefore, the image processing conditions G can be set more accurately than in the case of setting the image processing conditions G according to the photography information T alone. As a result, the processed image data S1 that enable reproduction of a high-quality image can be obtained.

By selecting the image processing conditions G in accordance with the inferred photography scene from the predetermined image processing conditions, the image processing conditions G can be set in a short time. Therefore, the image processing can be carried out efficiently.

In the digital camera 10, the density and colors of the image are changed to become appropriate by AE processing and AWB processing. However, the density and colors may not be desirable in the image represented by the image data S0 in the case where the AE processing and/or the AWB processing is troubled.

Figure 4:
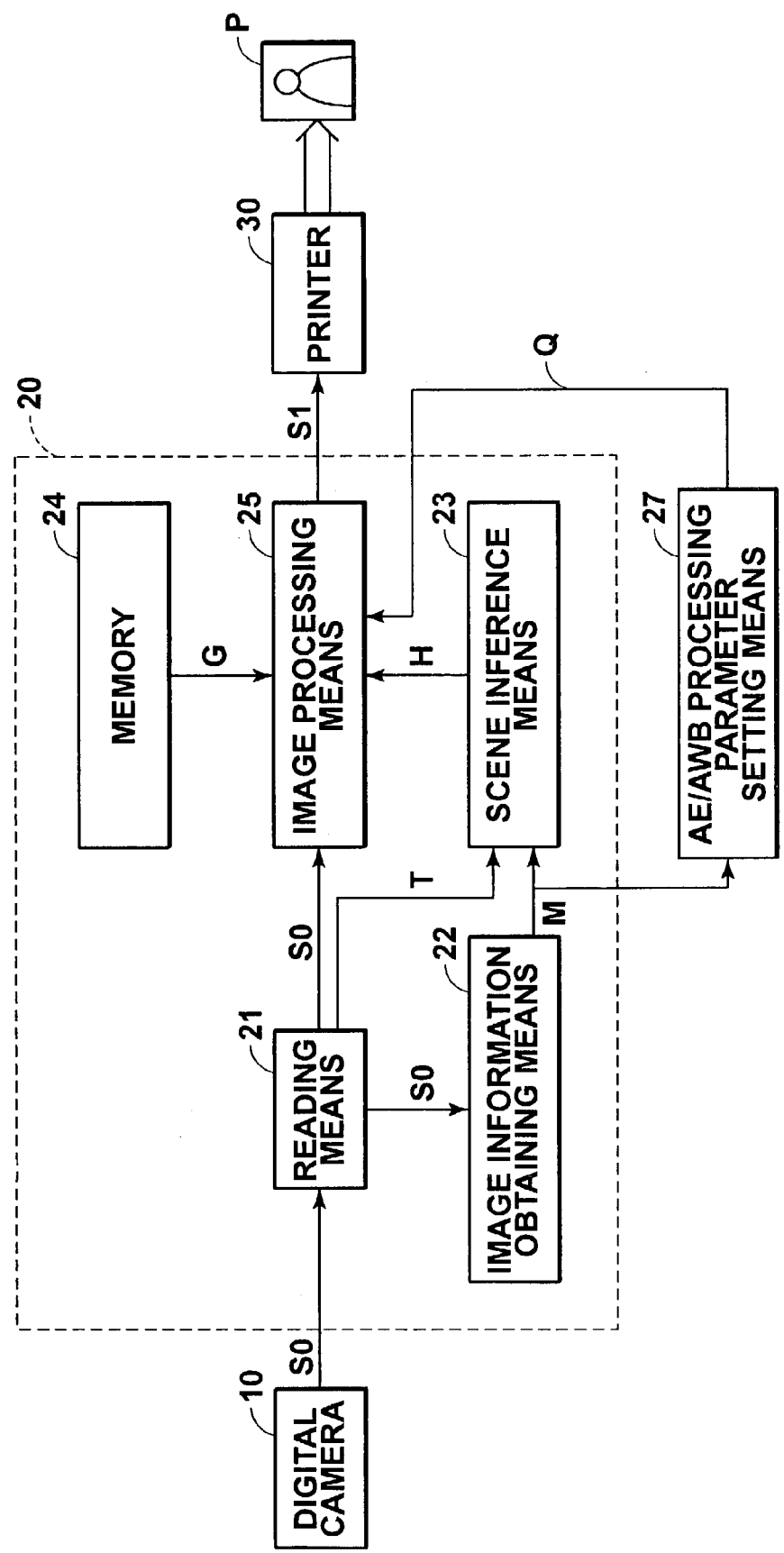
FIG. 4 is a block diagram showing a configuration of an image processing apparatus according to another embodiment of the present invention.

For this reason, as shown in FIG. 4, AE/AWB processing parameter setting means 27 may be used for setting parameters Q of the AE processing and/or the AWB processing according to the image information M. In this case, the parameters Q of the AE processing and/or the AWB processing are set based on the histogram information, the color temperature information, and the color distribution information included in the image information M so that the AE processing and/or the AWB processing is carried out on the image data S0 by the image processing means 25 according to the parameters Q that have been set.

In the above embodiment, the image processing conditions H are selected from the memory 24 based on the scene information H. However, the image processing conditions in accordance with the photography scene may be calculated based on the scene information H.

What is claimed is:

1. An image processing method for obtaining processed image data by carrying out image processing on image data obtained by a digital camera, the image processing method comprising the steps of:

obtaining photography information attached to the image data;

obtaining image information including information on a main part in an image represented by the image data;

inferring a photography scene of the image data, based on the photography information and the image information;

setting an image processing condition in accordance with the photography scene; and obtaining the processed image data by carrying out the image processing on the image data according to the image processing condition that has been set.

2. An image processing method as defined in claim 1, wherein the step of setting the image processing condition is the step of setting the image processing condition in accordance with the photography scene by selection from predetermined image processing conditions.

3. An image processing method as defined in claim 1, wherein the step of inferring the photography scene is the step of inferring the photography scene based on any two or more of items of the photography information comprising subject distance, magnification, subject brightness, and a flash state.

4. An image processing method as defined in claim 1, wherein said information on a main part in the image includes information regarding the presence or absence of a human face in the image.

5. An image processing method as defined in claim 4, wherein the image information further comprises at least one item of information form the group consisting of: information on a size of a background, frequency information on a degree of high-frequency component, information on brightness at a point of focus, histogram information representing a distribution in a histogram, information on color temperature of the image, and information on color distribution.

6. An image processing method as defined in claim 4, wherein said information on a main part in the image includes information regarding a size of the human face in the case that the human face is present in the image.

7. An image processing method as defined in claim 1, wherein obtaining image information further comprises judging the presence or absence of a human face in the image represented by the image data.

8. An image processing method as defined in claim 7, wherein judging the presence or absence of a human face in the image further comprises extracting a skin-color area from the image data and judging whether the extracted skin-color area is greater in size than a predetermined threshold value.

9. An image processing apparatus for obtaining processed image data by carrying out image processing on image data obtained by a digital camera, the image processing apparatus comprising:

photography information obtaining means for obtaining photography information attached to the image data;

image information obtaining means for obtaining image information including information on a main part in an image represented by the image data;

scene inference means for inferring a photography scene of the image data, based on the photography information and the image information; and image processing means for obtaining the processed image data by setting an image processing condition in accordance with the photography scene and then by carrying out the image processing on the image data according to the image processing condition that has been set.

10. An image processing apparatus as defined in claim 9, wherein the image processing means sets the image processing condition in accordance with the photography scene by selection from predetermined image processing conditions.

11. An image processing apparatus as defined in claim 9, wherein the scene inference means infers the photography scene based on any two or more of items of the photography information comprising subject distance, magnification, subject brightness and a flash state.

12. An image processing apparatus as defined in claim 9, wherein said information on a main part in the image includes information regarding the presence or absence of a human face in the image.

13. An image processing apparatus as defined in claim 12, wherein the image information further comprises at least one item of information from the group consisting of: information on a size of a background, frequency information on a degree of high-frequency component, information on brightness at a point of focus, histogram information representing a distribution in a histogram, information on color temperature of the image, and information on color distribution.

14. An image processing apparatus as defined in claim 12, wherein said information on a main part in the image includes information regarding a size of the human face in the case that the human face is present in the image.

15. An image processing apparatus as defined in claim 9, wherein the image information obtaining means judges the presence or absence of a human face in the image represented by the image data.

16. An image processing apparatus as defined in claim 15, wherein the image information obtaining means judges the presence or absence of a human face in the image by extracting a skin-color area from the image data and judging whether the extracted skin-color area is greater in size than a predetermined threshold value.

17. A computer-readable medium storing a program that causes a computer to execute an image processing method for obtaining processed image data by carrying out image processing on image data obtained by a digital camera, the program comprising the steps of:

obtaining photography information attached to the image data;

obtaining information on a main part in an image represented by the image data;

inferring a photography scene of the image data, based on the photography information and the main part information;

setting an image processing condition in accordance with the photography scene; and obtaining the processed image data by carrying out the image processing on the image data according to the image processing condition that has been set.

18. A computer-readable medium as defined in claim 17, wherein the step of setting the image processing condition is the step of setting the image processing condition in accordance with the photography scene by selection from predetermined image processing conditions.

19. A computer-readable medium as defined in claim 17, wherein the step of inferring the photography scene is the step of inferring the photography scene based on any two or more of items of the photography information comprising subject distance, magnification, subject brightness, and a flash state.

20. A computer-readable medium as defined in claim 17, wherein said information on a main part in the image includes information regarding the presence or absence of a human face in the image.

21. A computer-readable medium as defined in claim 20, wherein the image information further comprises at least one item of information from the group consisting of: information on a size of a background, frequency information on a degree of high-frequency component, information on brightness at a point of focus, histogram information representing a distribution in a histogram, information on color temperature of the image, and information on color distribution.

22. A computer-readable medium as defined in claim 20, wherein said information on a main part in the image includes information regarding a size of the human face in the case that the human face is present in the image.

23. A computer-readable medium as defined in claim 17, wherein obtaining image information further comprises judging the presence or absence of a human face in the image represented by the image data.

24. A computer-readable medium as defined in claim 23, wherein judging the presence or absence of a human face in the image further comprises extracting a skin-color area from the image data and judging whether the extracted skin-color area is greater in size than a predetermined threshold value.

* * * * *